United States Patent [19]

Vogt

[11] Patent Number: 5,500,509

[45] Date of Patent: Mar. 19, 1996

[54] MICROPROCESSOR BASED UNIVERSAL DIGITAL PRESSURE SENSOR

[75] Inventor: Carl R. Vogt, Raleigh, N.C.

[73] Assignee: Borg-Warner Automotive, Inc., Sterling Heights, Mich.

[21] Appl. No.: 204,116

[22] Filed: Mar. 1, 1994

[51] Int. Cl.[6] .................................................. H05B 1/02
[52] U.S. Cl. ........................ 219/501; 219/497; 219/496; 219/505; 73/862.623; 73/862.381
[58] Field of Search ................................... 219/501, 496, 219/497, 494, 505, 508, 494; 73/862.381, 862.623, 862.473

[56] References Cited

U.S. PATENT DOCUMENTS

| | | | |
|---|---|---|---|
| 3,843,877 | 10/1974 | Roselle et al. ............................. | 235/189 |
| 4,253,335 | 3/1981 | Shimomura ............................... | 73/384 |
| 4,295,376 | 10/1981 | Bell . | |
| 4,586,108 | 4/1986 | Frick ........................................ | 361/283 |
| 4,987,389 | 1/1991 | Brosh et al. . | |
| 5,121,118 | 6/1992 | Herman ..................................... | 341/118 |
| 5,255,656 | 10/1993 | Rader et al. . | |

OTHER PUBLICATIONS

Bryzek, Janusz "Evolution of Smart Sensors and Transducers Design," Proceedings of Sensors Expo, West, Mar. 2–4, 1993 Helmers Publishing, Peterborough, N.H.

*Primary Examiner*—Mark H. Paschall
*Attorney, Agent, or Firm*—Harness, Dickey & Pierce; Greg Dziegielewski

[57] ABSTRACT

A pressure sensing oscillator (12) and temperature sensing oscillator (14) each produce digital, oscillating signals having frequencies varying with respect to the pressure and temperature, respectively, sensed by each. The signals are input into a temperature compensation circuit (16) which effects a temperature compensation of the pressure signal in accordance with the digital temperature signal. The temperature compensated signal is then input into a microprocessor (18) which filters the signal and generates an output signal based on calibration values stored in an EEPROM. The resulting output signal represents a compensated, calibrated pressure signal. The format for the output signal is a pulse width modulated (PWM) signal having a percent modulation indicative of the temperature compensated, calibrated pressure.

26 Claims, 7 Drawing Sheets

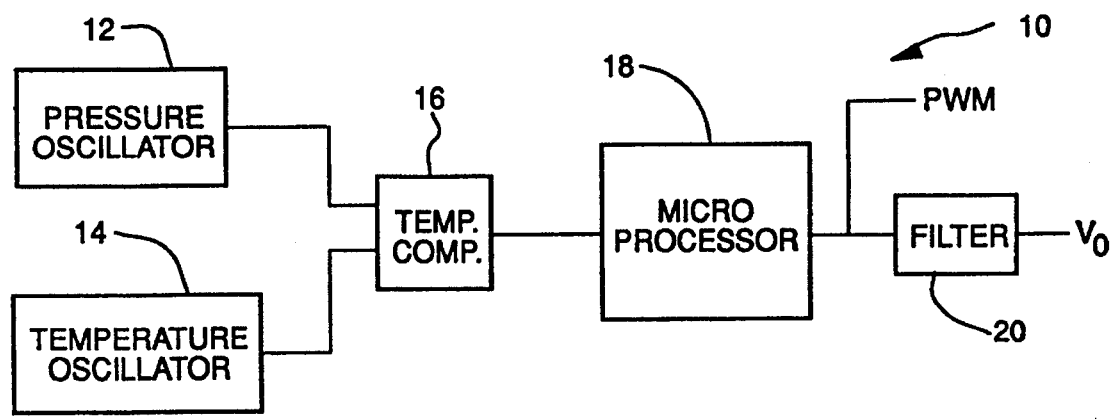
FIG - 1
FIG - 6
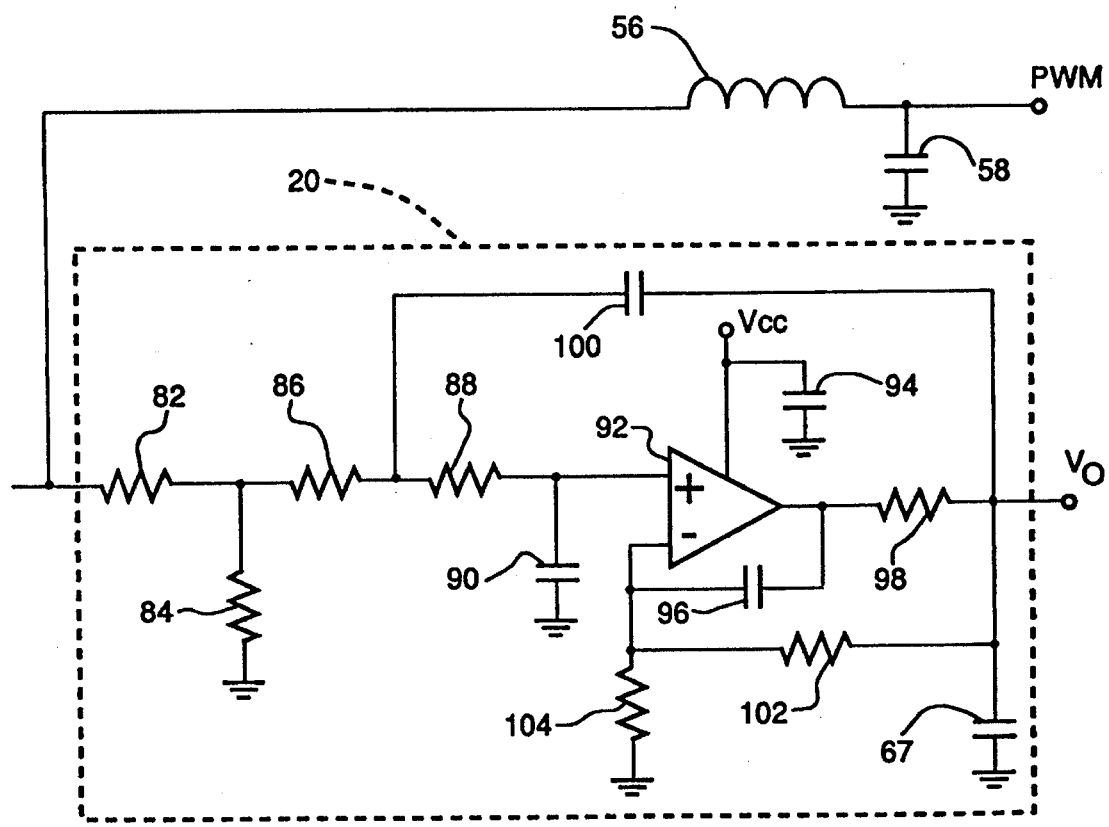

5,500,509

MICROPROCESSOR BASED UNIVERSAL DIGITAL PRESSURE SENSOR

BACKGROUND AND SUMMARY OF THE INVENTION

The present invention relates generally to pressure measuring circuits. More particularly, the invention relates to a temperature compensated pressure measuring circuit having a microprocessor which determines pressure based on oscillating, digital signals input to the microprocessor representative of sensed pressure and temperature. The microprocessor determines pressure in accordance with the input pressure and temperature and outputs a temperature compensated, calibrated pressure signal.

Piezoresistive pressure transducers are commonly used to measure pressure. In a typical application, a Wheatstone bridge is disposed on a thin silicon diaphragm of a piezoresistive sensing die which deflects in response to an applied pressure. When the thin silicon diaphragm of the sensing die deflects, the bridge resistance changes in accordance with the amount of deflection. A current or voltage signal energizes the bridge, and variations in the output signal indicate that the resistance, i.e., pressure on the diaphragm, has changed. The output signal is usually calibrated using calibration values determined on a piece by piece or lot by lot basis during the manufacturing process. In some piezoresistive pressure sensors, the resistance values of the bridge resistors may vary not only with changes in pressure, but also with changes in temperature as well, requiring temperature compensation in the output signal processing circuit.

In a typical analog circuit, temperature compensation comprises placing resistors unaffected by temperature variations in the Wheatstone bridge to significantly reduce temperature effects. Calibration of the piezoresistive sensor is then controlled by adjusting current to the bridge and measuring the bridge values at two temperatures and two pressures. This provides a temperature compensated, calibration curve for generating an output signal. Such a technique works well if the output values of the bridge resistances are fairly linear. However, nonlinearity of piezoresistive bridge resistors exists, especially at cold temperatures. Moreover, many other factors affect the linearity of the piezoresistive die including die size, diaphragm thickness, resistor geometry, resistor location on the diaphragm, and the resistor implant process effect.

The present invention provides a more accurate and efficient approach for performing temperature compensation on pressure measurements affected by temperature variations using a digital pressure sensing circuit. The digital pressure sensing circuit includes a first oscillator circuit for providing an oscillating pressure signal having a frequency varying in accordance with the sensed pressure and a second oscillator circuit for providing an oscillating temperature signal having a frequency varying an accordance with a sensed temperature. A temperature compensation means receives said pressure and temperature signal and provides an output signal in which the temperature based effect of the pressure signal are significantly diminished. A microprocessor receives the temperature compensated signal and generates an output signal varying in accordance with said temperature compensated signal. The output signal is based on stored, predetermined calibration values.

From the subsequent detailed description taken in conjunction with the accompanying drawings and subjoined claims, other objects and advantages of the present invention will become apparent to those skilled in the art.

BRIEF DESCRIPTION OF THE DRAWINGS

FIG. 1 is a block diagram of one embodiment of the microprocessor based universal digital pressure sensor;

FIG. 6 is a schematic diagram of an alternative implementation of the output filtering circuit of the microprocessor based universal digital pressure sensor shown in FIG. 1;

DETAILED DESCRIPTION OF THE DRAWINGS

Figure 2:
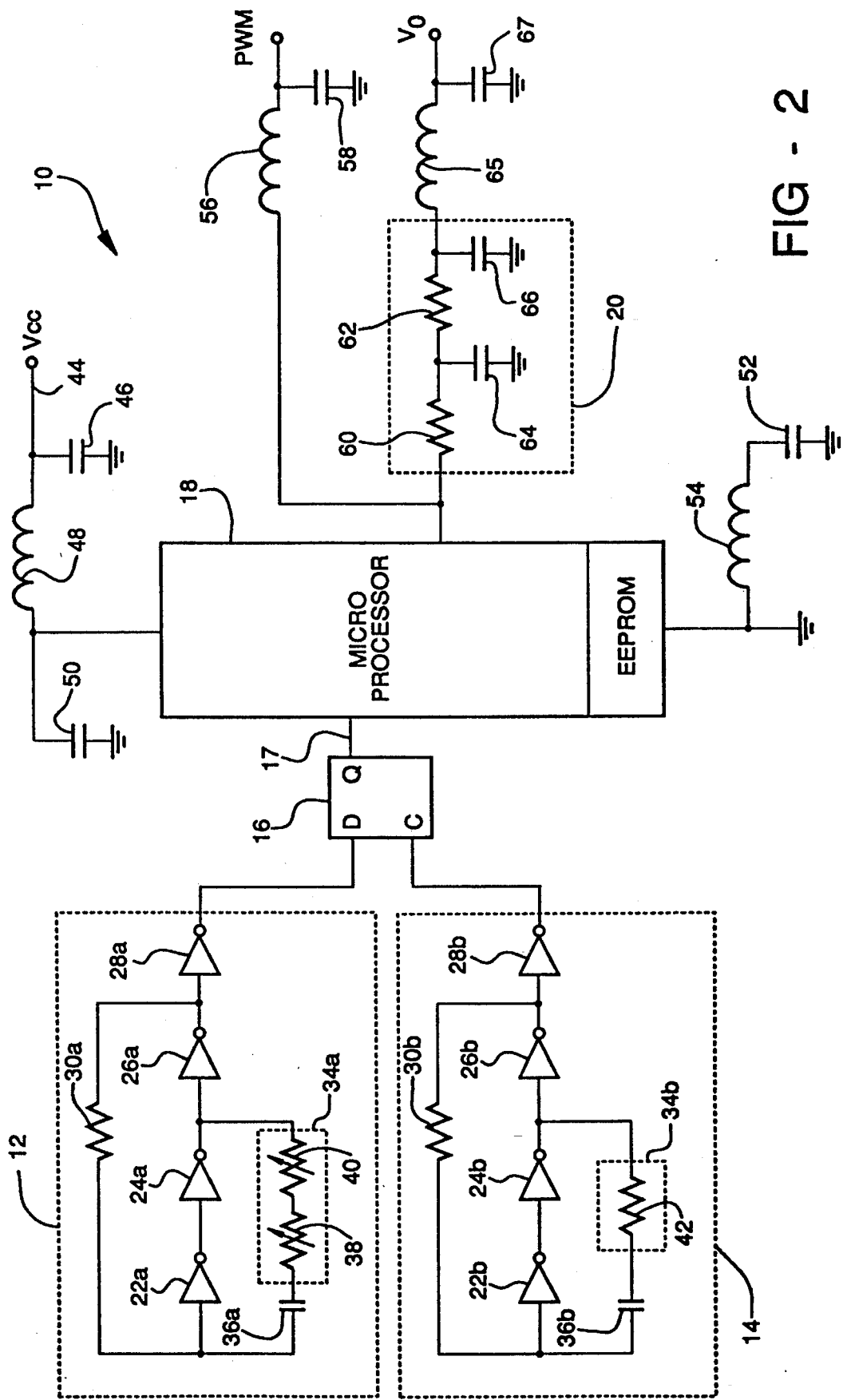
FIG. 2 is a schematic diagram of one embodiment of the microprocessor based universal digital pressure sensor according to the principles of this invention.

The microprocessor based universal digital pressure sensor has many applications. For example, the universal digital pressure sensor will be shown as a piezoresistive sensing circuit comprising a Wheatstone bridge on a thin silicon diaphragm of a piezoresistive die which enables conversion of pressure to an electrical signal. The Wheatstone bridge resistors have resistance values varying in accordance with the pressure applied to the thin silicon diaphragm. A baseline resistor located on the non-pressure sensing die section of the piezoresistive die has resistance values varying in accordance with temperature, but is relatively unaffected by pressure variations. Preferably, the temperature sensing resistor is located in proximity to the pressure sensing resistors so that temperatures experienced by the pressure sensing and temperature sensing resistors are substantially the same. In a piezoresistive sensor, the resistor located on the die portion of the sensor also provides a baseline for measuring resistance, enabling improved process control by comparing the resistance of the die resistor with the bridge resistance when both are at substantially the same pressure. This enables the process controller to do a certain amount of pressure sensor verification.

FIG. 1 illustrates a preferred embodiment of the microprocessor based universal digital pressure sensor which will be generally referred to as reference numeral 10. Digital pressure sensor 10 includes a pressure sensing oscillator circuit 12, a temperature sensing oscillator circuit 14, a temperature compensation circuit 16, a digital microprocessor 18, and an output filter 20. The pressure sensing oscillator circuit 12 provides an oscillating, digital frequency signal having a frequency varying with respect to the sensed pressure. The temperature sensing oscillator circuit 14 provides an oscillating, digital frequency signal having a frequency varying with respect to sensed temperature. The frequency signals output by the above described oscillator circuits are input to the temperature compensation circuit 16 which significantly diminishes any temperature induced frequency components in the oscillating pressure signal. The resulting temperature compensated signal is then input to microprocessor 18 which generates an output signal based upon calibration values stored in a lookup table. The output signal is scaled to a pulse width modulated signal values which is output by microprocessor 18. Filter 20 then performs an optional pulse width modulated to voltage level conversation to provide an analog pressure signal $V_0$. The above described blocks will be further described herein as the various circuit components that effect the above described operation are described in greater detail.

Pressure sensing oscillator circuit 12 and temperature sensing oscillator circuit 14 operate similarly in that a series resistance in a charging circuit varies in accordance with the property to be sensed. This varies the charge rate and, therefore, the output frequency of their respective oscillator circuits. The pressure sensing oscillator circuit 12 and the temperature sensing oscillator circuit 14 operate in substantially the same manner, except that the sense resistances which vary the charge rates for each circuit varies with pressure and temperature, respectively. Therefore, the circuits will be described generically using like reference numerals to describe substantially similar elements performing similar functions. However, reference numerals pertaining to the pressure sensing oscillator circuit 12 will be suffixed with the letter a and reference numerals pertaining to the temperature sensing oscillator circuit 14 will be suffixed with the letter b. Note further, that throughout the specification, substantially similar elements described throughout the specification will be reference with the same reference numerals. As shown in FIG. 2, pressure sensing oscillator circuit 12 and temperature sensing oscillator circuit 14 comprise a first inverter 22, a second inverter 24, a third inverter 26, and a fourth inverter 28. The inverters are in series so that first inverter 22 outputs a signal input to second inverter 24, which outputs a signal input into third inverter 26, which in turn outputs a signal input to fourth inverter 28. The output of third inverter 26 also provides a negative feedback loop including resistor 30. The output from second inverter 24 provides a positive feedback loop including pressure sensing resistance 34 and capacitor 36.

During operation, the series inverters 22, 24, 26, and 28 receive an input signal, invert the input signal based on digital threshold levels, and output the digital complement of the input signal. The negative feedback loop from the output of third inverter 26 through series resistance 30 provides a charging current for capacitor 36. The charging current and the rate of charge of capacitor 36 varies in accordance with the resistance values of sense resistor 34, which varies in accordance with the particular property, pressure or temperature, being sensed. Assuming that the output from third inverter 26 is a digital high voltage, a charging current flows through resistor 30, capacitor 36, and sense resistor 34, one terminal of which tied to a digital low voltage at the input to third inverter 26. The charging current flowing through the negative feedback loop varies as resistance 34 varies with the property being sensed. As a result, the charge rate of capacitor 36 is controlled by sensed property. When capacitor 36 charges above a digital high voltage threshold, first inverter 22 inverts the resulting digital high input signal and outputs a digital low signal, which in turn causes second inverter 24 to output a digital high signal, which causes third inverter 26 to output a digital low signal. Capacitor 36 then discharges through resistor 30 until the voltage across capacitor 36 drops below a digital low threshold, at which point first inverter 22 outputs a digital high signal, second inverter 24 outputs a digital low signal, and third inverter 26 outputs a digital high signal. Fourth inverter 28 inverts the output from third inverter 26 and provides a buffered digital signal to microprocessor 18. From the above description of pressure sensing oscillator circuits 12 and temperature oscillating circuit 14, it can be seen that the output signal from fourth inverter 28 oscillates at a frequency varying in accordance with the charge rate of the capacitor 36. As stated above the charge rate of the capacitor 36 depends upon the sense resistance 34 which in turn depends upon the property sensed by sense resistance 34. With respect to pressure sensing oscillator circuit 12, sense resistance 34a comprises two resistances 38 and 40 which typically are Wheatstone bridge resistances mounted on the thin silicon diaphragm of a piezoresistive sensing die. The resistance values of pressure sensing resistors 38 and 40 vary in accordance with the pressure applied to the thin silicon diaphragm. With respect to temperature sensing oscillator circuit 14, sense resistance 34b comprises temperature sensing resistance 42 which is mounted on the die portion of the piezoresistive die. The resistance value of temperature sensing resistor 42 varies in accordance with the sensed temperature.

Pressure sensing resistors 38 and 40 most preferably only measure pressure applied to the thin silicon diaphragm. However, pressure sensing resistors 38 and 40 also are susceptible to temperature variations for which compensation must be applied in order to obtain accurate pressure measurements. To achieve accurate temperature compensation, temperatures must be measured in proximity to pressure sensing resistors 38 and 40. In the preferred embodiment, temperature sensing resistor 42 is disposed on the piezoresistive sensing die, but is in sufficient proximity to experience similar to those experienced by sense resistors 38 and 40. Temperature compensating circuit 16 effects the temperature compensation according to a preferred embodiment of this invention. Temperature compensation circuit 16 comprises a D-flip flop having a signal input D, a clock input C, and a signal output Q. The output from pressure sensing oscillator circuit 12 is input into signal input D, and the output from temperature sensing circuit 14 is input into clock input C. Temperature compensation circuit 16 is a positive edge triggered flip-flop which gates to Q the signal at input D upon a positive-going transition at input C. When oscillating signals are input to temperature compensator 16 in this manner, the frequency of the input signal at clock C is in effect subtracted from the frequency of the input signal at input D, resulting in an output signal at output Q having a frequency varying in accordance with only the pressure experienced by sense resistance 34a. Thus, when temperature sensing resistor 42 is disposed in proximity to pressure sensing resistors 38 and 40, temperature compensation circuit 16 significantly diminishes the effects of temperature on the sensed pressure by effecting a subtraction of the signal frequency output by the temperature sensing oscillator circuit 14 from the signal frequency output by the pressure sensing oscillator circuit 12.

Figure 3A:
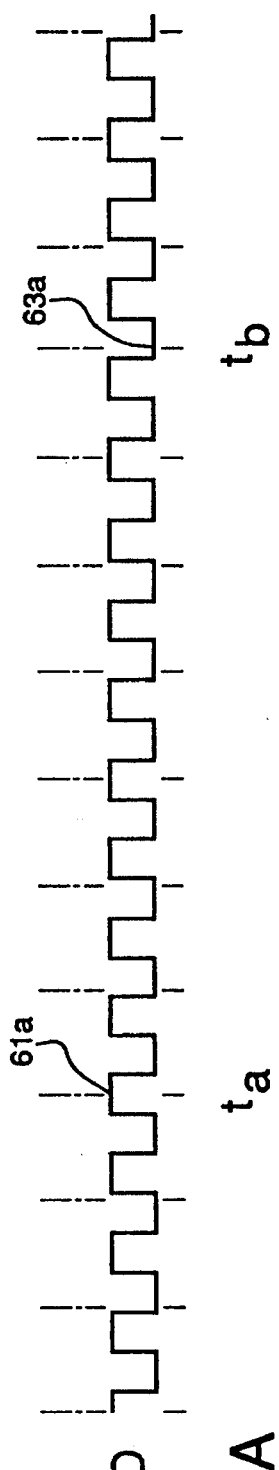
FIGS. 3a–3c depict waveforms associated with the temperature compensation circuit of the microprocessor based universal digital pressure sensor.
Figure 3B:
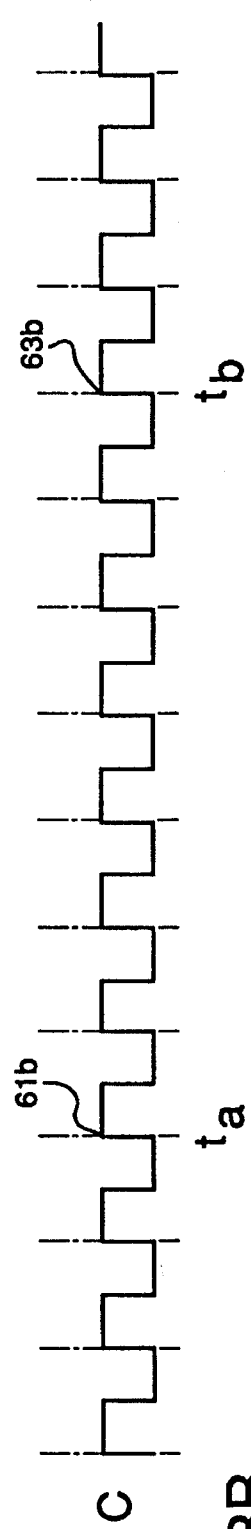
Figure 3C:
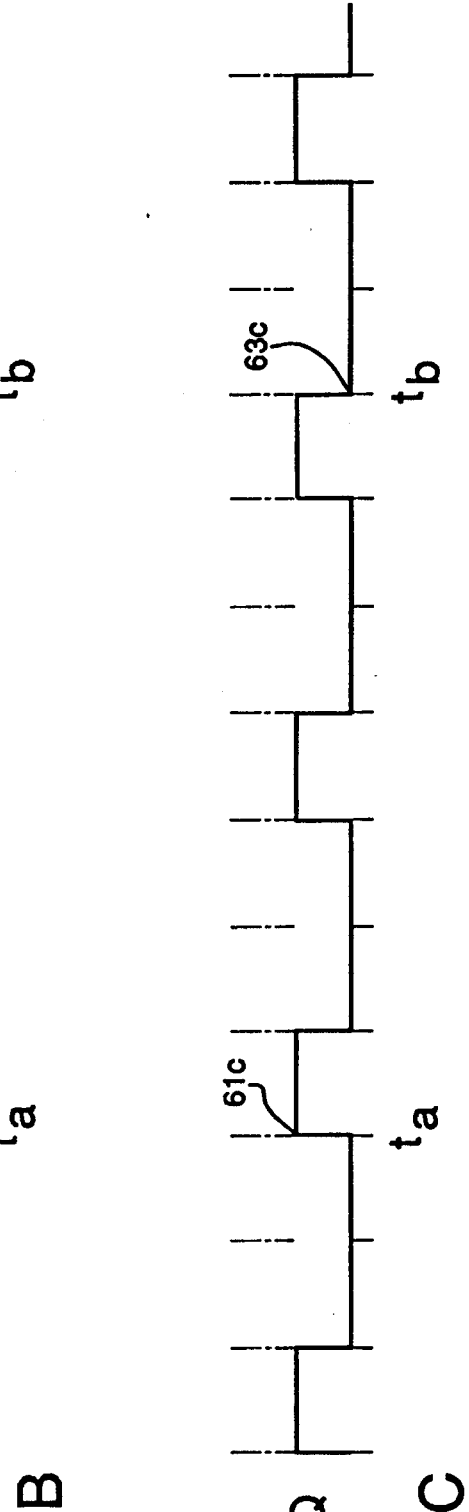

FIGS. 3a–c depict three waveforms corresponding to the input and output signals associated with temperature compensation circuit 16. FIG. 3a represents a waveform input to signal input D. FIG. 3b represents a waveform input to clock input C. FIG. 3c represents a waveform output from signal output Q. The level of output signal Q corresponds to the level of input signal D at the positive going transitions of the signal at to clock input C, which are represented in FIG. 3b with arrows. For example, at time $t_a$, clock input C experiences a positive going transition 61b. Because input signal D is high as shown at 61a, output signal Q transitions from a previously low value to high value 61c. Similarly, at time $t_b$, clock input C experiences a positive going transition 63b. Because input signal D is low as shown at 63a, output signal Q transitions from a previously high value to a low value 63c. If the frequency of input signal D is 83.33 kilo-Hertz (kHz) and the frequency of clock input C is 62.50 kHz, the frequency of output signal Q will be the difference between the two frequencies or 20.83 kHz. Thus, the temperature induced frequency component is removed from the pressure signal when the signals are input to temperature compensation circuit as described above.

Figure 4:
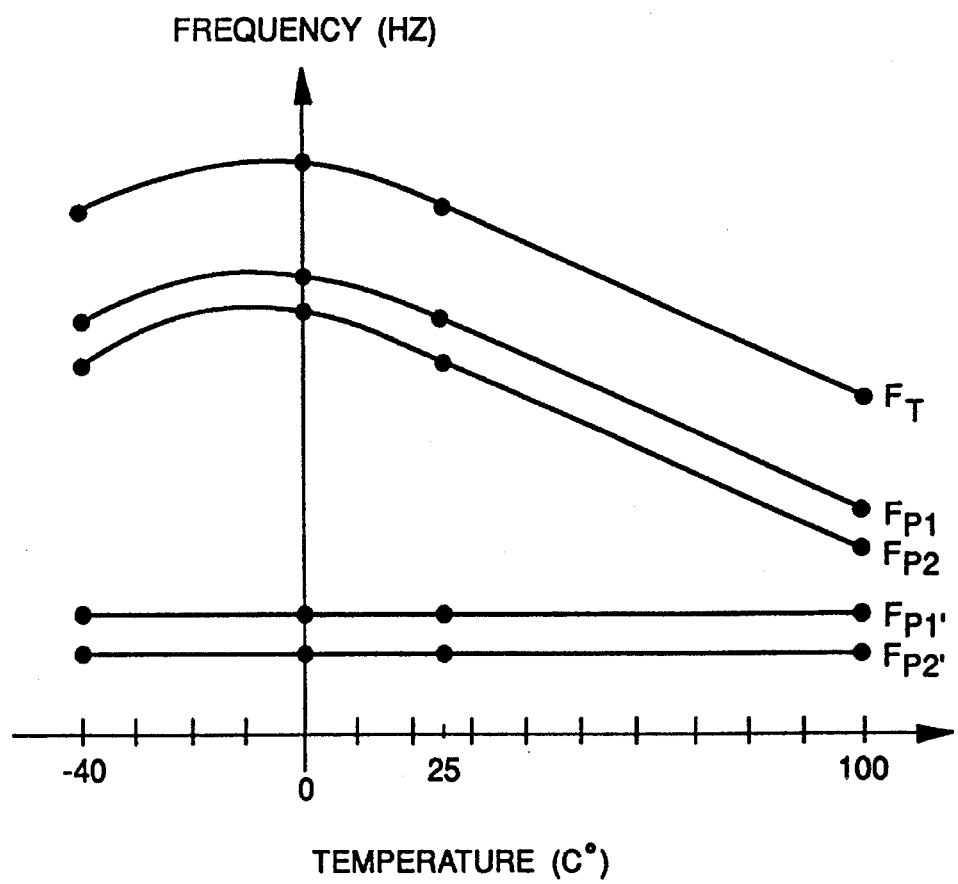
FIG. 4 is a graph of output frequency versus temperature for input and output signals to the temperature compensation circuit of the microprocessor based universal digital pressures sensor.

The above described temperature compensation may be better comprehended by reference to FIG. 4 which depicts a graph of the frequencies of the output signals from pressure sensing oscillator circuit 12, temperature sensing oscillator circuit 14, and temperature compensation circuit 16 at two constant pressures as the temperature varies. Pressure sensing oscillator circuit 14 outputs pressure frequency signals $F_{p1}$ and $F_{p2}$, corresponding to a first and second pressure, respectively, and input to signal input D of temperature compensation circuit 16. Note that pressure frequency signals $F_{p1}$ and $F_{p2}$ vary as the pressure remains constant and the temperature varies. Temperature sensing oscillator circuit 14 outputs temperature frequency signal $F_t$, corresponding this varying temperature and input to clock input C of temperature compensation circuit 16. Temperature compensation circuit 16 outputs frequency signals $F'_{p1}$ and $F'_{p2}$, corresponding to the temperature compensated output signal frequency at the first and second pressures, respectively, and output from Q signal output from temperature compensation circuit 16. As can be seen from the waveforms of FIG. 4, the input signals $F_{p1}$, $F_{p2}$, and $F_t$ have shapes which vary similarly with respect to temperature, but each pressure signal $F_{p1}$ and $F_{p2}$ is offset from the temperature signal $F_t$. When these signal are input to temperature compensation circuit 16, the temperature effects are substantially diminished as $F'_{p1}$ and $F'_{p2}$ demonstrate. The output signals $F'_{p1}$ and $F'_{p2}$ are thus temperature compensated output signals.

The output signal from temperature compensation circuit 16 is input into microprocessor 18 which determines the frequency of the incoming temperature compensated input signal. As will be explained in greater detail in FIG. 7, microprocessor 18 performs software filtering operations on the temperature compensated input signal. Microprocessor 18 also generates a pulse width modulated (PWM) output signal based on predetermined equation and calibration values stored in EEPROM. Microprocessor 18 is powered by supply voltage $V_{cc}$ which is supplied to microprocessor 18 across noise suppressing capacitor 46 and an LC circuit comprising inductor 48 and capacitor 50. Microprocessor 18 is connected to ground in parallel through LC circuit comprising inductor 54 and capacitor 52. Microprocessor 18 provides a temperature compensated and calibrated output signal varying in accordance with the pressure applied to the thin silicon diaphragm of the piezoresistive sensing die. The output signal may be any of a number of known microprocessor output signals for conveying information, including a pulse width modulated signal, a frequency signal, or an analog signal, each of which depends on the sensed pressure and temperature. In the preferred embodiment, microprocessor 18 provides a pulse width modulated signal at its output. This PWM signal is output across a series inductance 56 and a parallel capacitor 58 which provide noise suppression on the pulse width modulation output signal line.

Optionally, the pulse width modulated signal may be converted to an analog signal having a voltage level varying in accordance with the percent pulse width modulation of the output signal. Filter 20 effects the pulse width modulation to voltage level conversion. Filter 20 is embodied in FIG. 2 as a second order RC filter. The first order portion of output filter 20 includes resistor 60 and grounded capacitor 64, and the second order portion of output filter 20 includes resistor 62 and grounded capacitor 66. The first order portion of output filter 20 outputs a voltage which varies in accordance with the PWM output value. The second order portion of output filter 20 provides additional filtering. The first and second order portions of the filters effect a conversion of the pulse width modulation signal to an output voltage having a magnitude reflective of the percentage of pulse width modulation. Filter 20 is well know to one skilled in the art and is commonly used in such applications.

Figure 5:
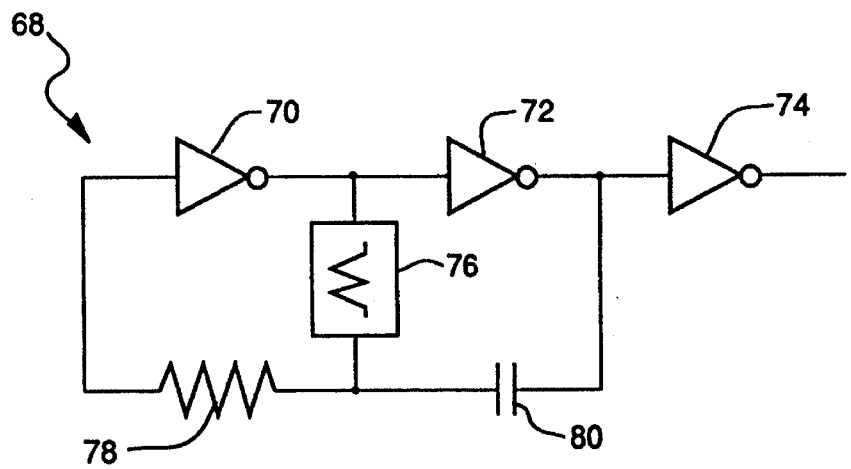
FIG. 5 is a schematic diagram of an alternative implementation of the digital oscillator circuits of the microprocessor based universal digital pressure sensor shown in FIG. 1.

FIG. 5 depicts an oscillator circuit 68 providing an alternative embodiment for either of pressure sensing oscillator circuit 12 or temperature sensing oscillator circuit 14. Oscillator circuit 68 includes a first inverter 70, a second inverter 72, and a third inverter 74. The inverters 70, 72, and 74 are arranged in series so that first inverter 70 outputs a signal input to second inverter 72, and second inverter 72 outputs a signal input into third inverter 74. Oscillator circuit 68 includes a negative feedback loop having a sense resistance 76 in parallel with resistor 78 and first inverter 70. Sense resistance 76 is also in parallel with capacitor 80 and second inverter 72. In operation, assuming that the input to first inverter 70 is a digital low signal, the output from inverter 70 will be high, and the output from inverter 72 will be low. This induces a charging current to flow through sense resistance 76 and capacitor 80. When capacitor 80 has charged a digital high threshold level, the input to first inverter 70 becomes a digital high voltage, inverter 70 outputs a digital low voltage, and inverter 72 outputs a digital high voltage. Capacitor 80 will then discharge through sense resistor 76 until the input to first inverter 70 drops below a digital low threshold voltage and outputs a digital high voltage. In this manner, by varying sense resistance 76, the charge rate of capacitor 80 varies. Thus, the output signal from third inverter 74 has a frequency which varies in accordance with the value of sense resistance 76. With respect to pressure sensing oscillator circuit 12 and temperature sensing oscillator circuit 14, oscillator circuit 68 senses either pressure or temperature depending on the particular use of sense resistance 76. If sense resistance 76 is analogous to pressure sensing resistance 34a of FIG. 1, oscillator circuit 68 will output a digital signal having a frequency indicative of pressure. If sense resistance 76 is analogous to temperature sensing resistance 34b of FIG. 1, oscillator circuit 68 will output a digital signal having a frequency indicative of temperature. Note that oscillator circuit 68 may be substituted for either of pressure sensing oscillator circuit 12 or temperature sensing oscillator circuit 14 with the appropriate substitution for sense resistance 76. If such a substitution is effected depending on the property sensed by sense resistor 76, the output from third inverter 74 is input to the appropriate one of either the D input or the C input of temperature compensation circuit 16 of FIG. 1.

FIG. 6 depicts an alternative embodiment for output filter 20 for converting the pulse width modulated output into a variable voltage signal. Once again, it should be noted that like elements performing similar functions will be referred to with the same reference numerals. In the alternative embodiment of filter 20, filter 20 is also a second order filter. The pulse width modulated signal is applied to filter 20 through a voltage divider comprising resistors 82 and 84.

The output from the voltage divider passes through series resistors 86 and 88 and across capacitor 90, the combination of which effects a PWM to DC signal conversion. The DC signal is applied to the non-inverting input of operational amplifier 92. Operational amplifier 92 is biased by a voltage Vcc across noise suppression capacitor 94. Output from operational amplifier 92 charges a feedback capacitor 96 which is fed back to the non-inverting input of operational amplifier 92. Output from operational amplifier 92 and series resistor 98 is a variable voltage $V_0$. Resistor 102 and resistor 104 comprise a voltage divider for the feedback voltage to the non-inverting input of operational amplifier 92. The configuration of filter 20 as described in FIG. 5 may be used in application for filter 20 as described with respect to FIG. 1. Filters of this type are well known in the art and will not be described further herein. Such a filter is described in U.S. Pat. No. 5,225,656, issued on Oct. 26, 1993, and assigned to the assignee of the present invention and herein incorporated by reference.

Figure 7:
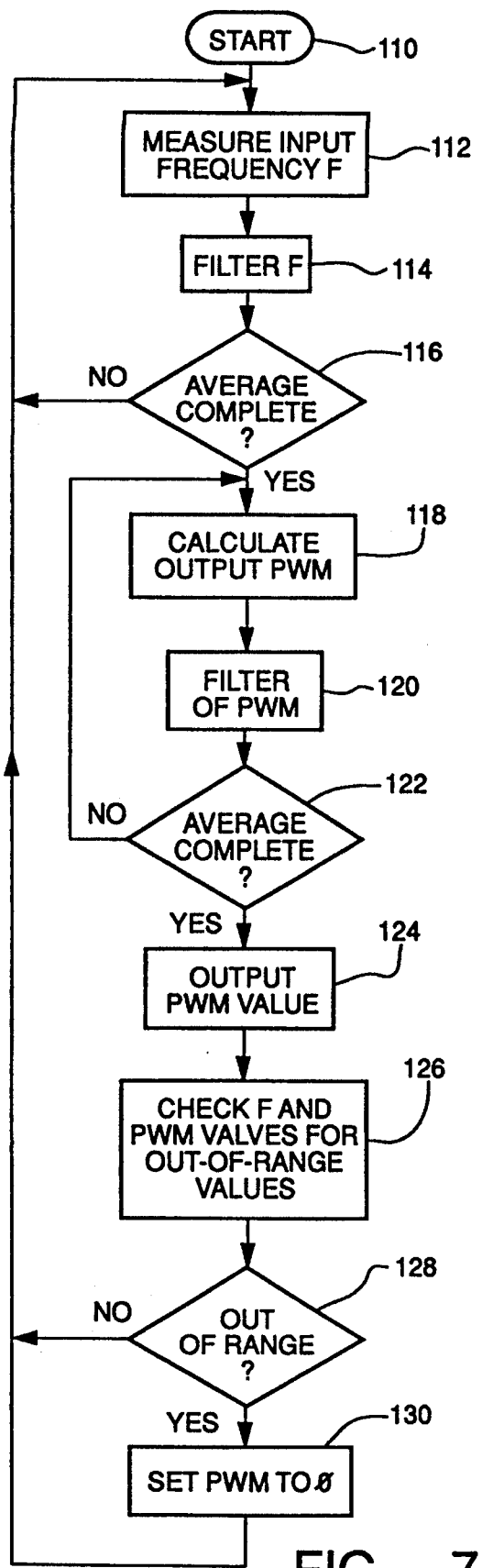
FIG. 7 is a flow diagram depicting operation of the microprocessor of FIG. 1.

FIG. 7 depicts a flow diagram of the operations carried out by the microprocessor 18 in order to generate a PWM output signal. Microprocessor 18 is preferably a MC68HC05 microprocessor, but as is well known in the art, any of a number of microprocessors may be substituted therefore. After initialization and start up of microprocessor 18, control is passed to a start block 110. At block 112, the frequency of the digital signal input to microprocessor 18 is measured. This may typically be done by measuring the time difference between positive going edges of the input signal, yielding the reciprocal of frequency. Once the frequency of the input signal is determined, a software routine filters the input frequency F by averaging the frequencies over a predetermined number of past measured frequencies, as depicted at block 114. The number of past frequencies used for the averaging function depends upon the desired response characteristic of the system. If a slower but smoother response is desired, a greater number of past values will be averaged. For a quicker but less smooth response, a relatively few number of past values will be averaged. If the averaging process is not complete, block 116 returns control back to block 112 where additional frequency measurements and averaging at block 114 occurs. If the averaging process is complete, control is passed to block 118 where the pulse width modulation value is calculated. The calculated pulse width modulation value is filtered at block 120 using a similar averaging algorithm as described with respect to block 114. Block 122 performs a test to determine if the averaging process is complete. If the averaging process is not complete, control is returned to block 118 where additional pulse width modulation values are calculated, then to block 120 where additional filtering occurs. If the averaging process is complete, control is then passed to block 124 in which the filtered PWM value is output. After the pulse width modulation value has been output, error checking and diagnostics are performed at block 126 to determine if the frequency or the pulse width modulation values are out of range. If the values are out of range, as tested at decision block 128, the pulse width modulation value is set to zero at block 130 and control returns to block 112 where the frequency of the incoming temperature compensated pressure signal is measured. If the pulse width modulation or the frequency values are not out of range, the pulse width modulation value remains unchanged, and control is returned to block 112 where the input frequency of the temperature compensated signal is measured.

When temperature compensation circuit 16 performs temperature compensation off-board from microprocessor 18, microprocessor 18 performs substantially fewer processing steps and memory lookups. In the preferred embodiment of this invention, calibration of the frequency signal to yield the output is relatively linear. The slope of the linear equation is factory calibrated in accordance with the measured frequencies for at least 2 different pressures. Microprocessor 18 thus generates output signals extremely quickly, enabling faster response times or multiple pressure sensor handling using only one microprocessor 18.

Figure 8:
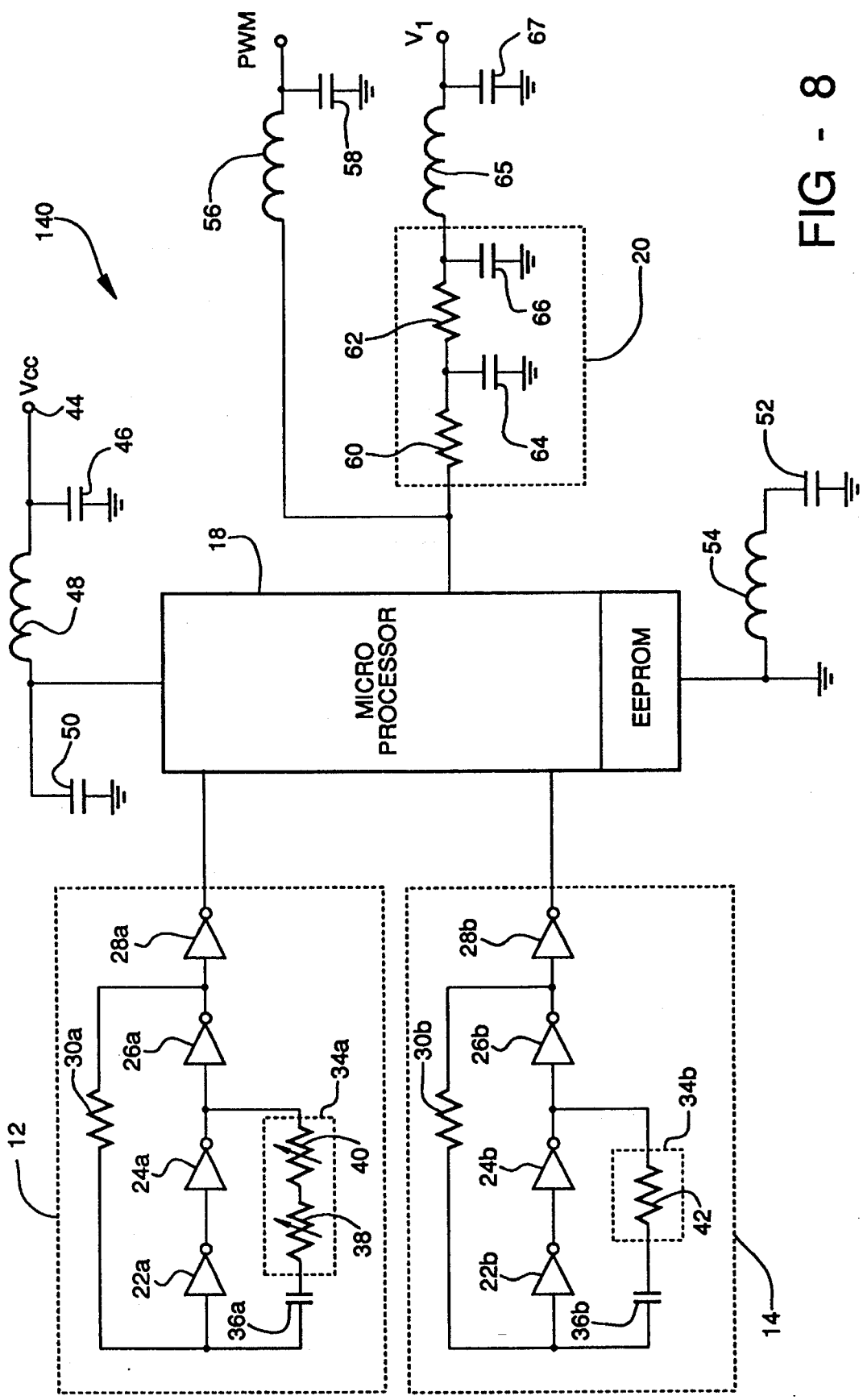
FIG. 8 is a schematic diagram of an alternative embodiment of the microprocessor based universal digital pressure sensor.

FIG. 8 depicts an alternative embodiment for the microprocessor based digital pressure sensor which will be generally referred to by reference numeral 140. Note again that like elements to those described with respect to FIGS. 1–7 are referred to with like reference numerals. The microprocessor based universal pressure sensor 140 depicted in FIG. 8 generally includes a pressure sensing oscillator circuit 12 and a temperature sensing oscillator circuit 14, both of which function identically to the pressure sensing oscillator circuit and temperature sensing oscillator circuit described with respect to FIG. 1. However, the oscillating digital signals output by fourth inverters 28a and 28b of FIG. 8 are input directly to microprocessor 18 rather than to temperature compensation circuit 16. Microprocessor 18 of FIG. 8 effects both temperature compensation and calibration in generating a temperature compensated, calibrated PWM output signal. Note that microprocessor 18 of FIG. 8 and microprocessor 18 of FIG. 2 may be identical microprocessors, preferably a MC68HC05 microprocessor as is well known in the art. However, the software programming and stored EEPROM values in microprocessor 18 of FIG. 8 will vary from that of microprocessor 18 of FIG. 2. Note that oscillating circuit 68 of FIG. 5 may alternatively be substituted for either of pressure sensing oscillator circuit 12 and/or temperature oscillating circuit 14 of FIG. 8 provided that the proper substitution of pressure or temperature sensing resistors for sense resistance 76 is effected. Furthermore, note that the alternative embodiment for output filter 20 depicted in FIG. 6 may readily be substituted for filter 20 of FIG. 8.

Figure 9:
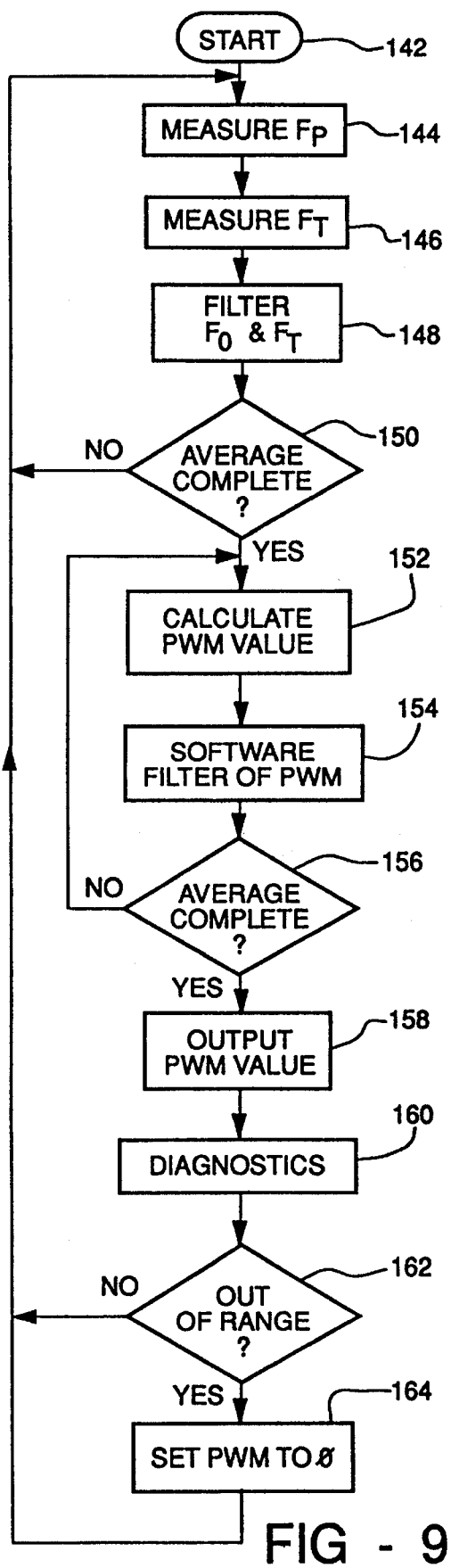
FIG. 9 is a flow diagram depicting operation of the microprocessor of FIG. 8.

With respect to the software control of the microprocessor based digital pressure sensor circuit 140, FIG. 9 is a flow chart detailing the pressure sensing segment of the software for microprocessor 18 of pressure sensing circuit 140 in which both temperature compensation and calibration are effected. In FIG. 9, after microprocessor 18 has performed initial start-up and diagnostic functions, control passes to the pressure sensing portion of the software at starting block 142. Control then passes to block 144 which determines the frequency of the incoming digital pressure signal $F_p$ output by fourth inverter 28a of FIG. 8. Similarly, at block 146, the frequency of the digital temperature signal $F_t$ output by fourth inverter 28b of FIG. 8. The temperature and pressure frequency signals may be determined by microprocessor 18 in accordance with the time differential between positive going pulse transitions, yielding the reciprocal of frequency. At block 148, the measured frequency $F_p$ and the measured frequency $F_t$ are filtered by averaging historical values of each of $F_0$ and $F_t$. AS stated above the number of past values of either of the frequencies used for the averaging function depends upon the desired response characteristic of the system. If a slower but smoother response is desired, a greater number of past values will be averaged. For a quicker but less smooth response, a relatively few number of past values will be averaged. Block 150 determines if the averaging process has been completed, returning program control to block 144 to repeat the frequency determination and filtering process if the averaging is not complete, and passing control onto block 152 if averaging is complete. Block 152 determines the pulse width modulation value to be output by microprocessor 18 in accordance with predetermined values stores in EEPROM of microprocessor 18. In microprocessor 18 of FIG. 8, values stored in EEPROM correspond to the frequencies measured for both pressure and temperature. The values stored in EEPROM are stored in a look-up table, the addresses of which correspond to measured frequencies. The values from the table are then substituted into an equation which determines a PWM value based on the look-up values addressed using the measured frequencies. At block 154, a software filter filters the PWM value using an averaging method as described with respect to block 148. At block 156, a test is performed to determine if the averaging process is complete. If the process is not complete, program control returns to block 152 where additional pulse width modulation values are calculated and filtered at block 154. If the averaging process is complete, the pulse width modulation value is output by the processor at block 158. At block 160, diagnostics are performed to determine if the measured pressure frequency, measured temperature frequency, and pulse width modulation values are within a predetermined range. If any of the above-named values are out of range, block 162 passes program control to block 164 which resets the pulse width modulation value to zero. If the values are within range, however, program control is returned to block 144 for additional pressure measurement determinations are made.

While the microprocessor based pressure sensing circuit 10 of FIG. 2 is a preferable embodiment to the microprocessor based pressure measuring circuit 140 depicted in FIG. 8, the microprocessor based digital pressure sensor 140 depicted in FIG. 7 may be suitable for a number of applications. The primary advantage of the microprocessor based digital pressure sensor 10 depicted in FIG. 2 is a reduction in the software overhead to determine the pulse width modulation output. This reduction occurs because a linear calibration determines the output signal in pressure sensing circuit 10, while a polynomial calibration determines the output signal in pressure sensing circuit 140, requiring EEPROM memory lookups for a number of equation coefficients. While the polynomial calibration compensates for both temperature and frequency, it is much slower because of the additional process required for the EEPROM lookups and the processing of the polynomial.

Several advantages are realized from the universal digital pressure sensor as described herein. First, the pressure sensor reduces the need for expensive electromagnetic interference shielding techniques, enabling use of less expensive techniques because the signals are digital signals. Second, the microprocessors can be used for calibrating the pressure sensors, rather than the commonly used laser trim calibration systems. Third, there is expanded flexibility in calibrating nonlinearities inherent in piezoresistive sensors. Moreover, if temperature compensation occurs off-board the microprocessor, the software overhead is greatly reduced. Off-board temperature compensation also enables use of a primarily linear calibration, but additional compensation for non-linearities may also be provided. Finally, temperature compensation in software would be virtually eliminated, eliminating the need to test sensors at different temperatures, and testing at different temperatures would only be required for sensor verification.

While the above detailed description describes the preferred embodiment of the present invention, it will be understood that the present invention is susceptible to modification, variation and alteration without deviating from the scope and fair meaning of the subjoined claims.

What is claimed is:

1. A digital pressure sensor comprising:

a first oscillator circuit providing an oscillating pressure signal having a frequency varying in accordance with a sensed pressure, said sensed pressure signal having a temperature based frequency component;

a second oscillator circuit providing an oscillating temperature signal having a frequency varying in accordance with a sensed temperature;

temperature compensation gating means coupled to said first and second oscillators, the gating means performing frequency domain subtraction of said pressure signal having frequency corresponding to the difference between the frequencies of said first and second oscillators; and a microprocessor providing an output signal varying in accordance with said temperature compensated signal, said microprocessor having stored, predetermined calibration values which adjustably vary said temperature compensated signal to yield said output signal.

2. The apparatus as defined in claim 1 wherein said temperature compensation means comprises a gate circuit having a gated input, a gating input, and an output, said pressure signal being applied to said gated input and said temperature signal being applied to said gating input such that said temperature signal gates said pressure signal to the output of said gating circuit, said gated output being said temperature compensated signal.

3. The apparatus as defined in claim 2 wherein said gate circuit is a D flip-flop having a D input, a clock input, and a Q output, and said D input corresponds to said gated input, said clock input corresponds to said D input, and said Q output corresponds to said output.

4. The apparatus as defined in claim 3 wherein said pressure oscillator circuit further comprises:

a digital circuit comprising first, second, third, and fourth inverters coupled in series and each having an input and an output, the output of said first inverter coupled to the input of said second inverter, the output of said second inverter coupled to the input of said third inverter, and the output of said third inverter coupled to the input of said fourth inverter, said digital circuit being operable between bistable high and low states;

positive feedback means coupled in series with a pressure sensing resistance and a capacitance between the output of said second inverter and the input to said first inverter, said pressure sensing resistance varying in accordance with a pressure experienced by said pressure sensing resistance;

negative feedback means in series with a resistance coupled between the output of said third inverter and the input of said first inverter, said negative feedback means providing a charging current for said capacitance;

said pressure sensing resistance varying the charge rate of said capacitance by varying the current flowing through said capacitance in accordance with the pressure sensed by said resistance;

said fourth inverter producing at the output a signal which oscillates between said high and low states at a frequency in accordance with said sensed pressure.

5. The apparatus as defined in claim 4 wherein said pressure sensing resistance comprises at least one resistor of a Wheatstone bridge disposed on a pressure sensing portion of said piezoresistive sensor.

6. The apparatus as defined in claim 4 wherein said temperature oscillator circuit further comprises:

a digital circuit comprising first, second, third, and fourth inverters coupled in series and each having an input and an output, the output of said first inverter coupled to the input of said second inverter, the output of said second inverter coupled to the input of said third inverter, and the output of said third inverter coupled to the input of said fourth inverter, said digital circuit being operable between bistable high and low states;

positive feedback means coupled in series with a temperature sensing resistance and a capacitance between the output of said second inverter and the input to said first inverter, said temperature sensing resistance varying in accordance with a temperature sensed by said pressure sensing resistance;

negative feedback means in series with a resistance coupled between the output of said third inverter and the input of said first inverter, said negative feedback means providing a charging current for said capacitance;

said temperature sensing resistance varying the charge rate of said capacitance by varying the current flowing through said capacitance in accordance with the temperature sensed by said resistance;

said fourth inverter producing at the output a signal which oscillates between said high and low states at a frequency in accordance with said sensed temperature.

7. The apparatus as defined in claim 6 wherein said temperature sensing resistance comprises at least one resistor disposed in proximity to said pressure sensing resistance so that said pressure sensing and temperature sensing resistances are subject to substantially the same temperatures.

8. The apparatus as defined in claim 6 wherein the output signal provided by said microprocessor is a pulse width modulated signal having a pulse width percentage which varies in accordance with the output signal.

9. The apparatus as defined in claim 8 further comprising an output filter circuit for converting said pulse width modulated signal to a voltage signal having a voltage level varying with respect to the percent pulse width.

10. The apparatus as defined in claim 1 wherein said temperature compensation means and said microprocessor are an integrated unit and said integrated unit further comprises:

means for filtering each of said pressure signal and said temperature signal to remove noise in each of said pressure signal and temperature signal;

means for determining said output signal in accordance with values stored in a look-up table, wherein said filtered pressure signal and said filtered temperature signal define locations in said look-up table, said locations having values which compensate for said sensed temperature; and means for filtering said output signal to remove noise from said output signal, said filtered signal being output by said microprocessor and being representative of a temperature compensated, calibrated pressure signal.

11. The apparatus as defined in claim 10 wherein said means for filtering each of said pressure signal, said temperature signal, and said output signal averages each of said signals over time.

12. The apparatus as defined in claim 11 wherein said pressure oscillator circuit further comprises:

a digital circuit comprising first, second, third, and fourth inverters coupled in series and each having an input and an output, the output of said first inverter coupled to the input of said second inverter, the output of said second inverter coupled to the input of said third inverter, and the output of said third inverter coupled to the input of said fourth inverter, said digital circuit being operable between bistable high and low states;

positive feedback means coupled in series with a pressure sensing resistance and a capacitance between the output of said second inverter and the input to said first inverter, said pressure sensing resistance varying in accordance with a pressure experienced by said pressure sensing resistance;

negative feedback means in series with a resistance coupled between the output of said third inverter and the input of said first inverter, said negative feedback means providing a charging current for said capacitance;

said pressure sensing resistance varying the charge rate of said capacitance by varying the current flowing through said capacitance in accordance with the pressure sensed by said resistance;

said fourth inverter producing at the output a signal which oscillates between said high and low states at a frequency in accordance with said sensed pressure.

13. The apparatus as defined in claim 12 wherein said pressure sensing resistance comprises at least one resistor of a Wheatstone bridge disposed on a pressure sensing portion of said piezoresistive sensor.

14. The apparatus as defined in claim 12 wherein said temperature oscillator circuit further comprises:

a digital circuit comprising first, second, third, and fourth inverters coupled in series and each having an input and an output, the output of said first inverter coupled to the input of said second inverter, the output of said second inverter coupled to the input of said third inverter, and the output of said third inverter coupled to the input of said fourth inverter, said digital circuit being operable between bistable high and low states;

positive feedback means coupled in series with a temperature sensing resistance and a capacitance between the output of said second inverter and the input to said first inverter, said temperature sensing resistance varying in accordance with a temperature sensed by said pressure sensing resistance;

negative feedback means in series with a resistance coupled between the output of said third inverter and the input of said first inverter, said negative feedback means providing a charging current for said capacitance;

said temperature sensing resistance varying the charge rate of said capacitance by varying the current flowing through said capacitance in accordance with the temperature sensed by said resistance;

said fourth inverter producing at the output a signal which oscillates between said high and low states at a frequency in accordance with said sensed temperature.

15. The apparatus as defined in claim 14 wherein said temperature sensing resistance comprises at least one resistor disposed in proximity to said pressure sensing resistance so that said pressure sensing and temperature sensing resistances are subject to substantially the same temperatures.

16. The apparatus as defined in claim 14 wherein the output signal provided by said microprocessor is a pulse width modulated signal having a pulse width percentage which varies in accordance with the output signal.

17. The apparatus as defined in claim 16 further comprising an output filter conversion circuit for converting said pulse width modulated signal to a voltage signal having a voltage level varying with respect to the percent pulse width.

18. A digital pressure sensor comprising:

a first oscillator circuit providing an oscillating pressure signal having a frequency varying in accordance with a sensed pressure, said sensed pressure signal having a temperature based frequency component;

a second oscillator circuit providing an oscillating temperature signal having a frequency varying in accordance with a sensed temperature;

temperature compensation gating means coupled to said first and second oscillators, the gating means performing frequency domain subtraction of said pressure signal and said temperature signal to yield a temperature compensated signal having a frequency corresponding to the difference between the frequencies of said first and second oscillators;

a microprocessor receiving and providing an output signal varying in accordance with said temperature compensated signal, said microprocessor having;

means for filtering each of said pressure signal and said temperature signal to remove noise in each of said pressure signal and temperature signal:

means for determining said output signal in accordance with values stored in a look-up table, wherein said filtered pressure signal and said filtered temperature signal define locations in said look-up table, said locations having values which compensate for said sensed temperature.

19. The apparatus as defined in claim 18 wherein said microprocessor further comprises a means for filtering said output signal to remove noise from said output signal, said filtered signal being output by said microprocessor and being representative of a temperature compensated, calibrated pressure signal.

20. The apparatus as defined in claim 19 wherein said means for filtering each of said pressure signal, said temperature signal, and said output signal averages each of said signals over time.

21. The apparatus as defined in claim 18 wherein said pressure oscillator circuit further comprises:

a digital circuit comprising first, second, third, and fourth inverters coupled in series and each having an input and an output, the output of said first inverter coupled to the input of said second inverter, the output of said second inverter coupled to the input of said third inverter, and the output of said third inverter coupled to the input of said fourth inverter, said digital circuit being operable between bistable high and low states;

positive feedback means coupled in series with a pressure sensing resistance and a capacitance between the output of said second inverter and the input to said first inverter, said pressure sensing resistance varying in accordance with a pressure experienced by said pressure sensing resistance;

negative feedback means in series with a resistance coupled between the output of said third inverter and the input of said first inverter, said negative feedback means providing a charging current for said capacitance;

said pressure sensing resistance varying the charge rate of said capacitance by varying the current flowing through said capacitance in accordance with the pressure sensed by said resistance;

said fourth inverter producing at the output a signal which oscillates between said high and low states at a frequency in accordance with said sensed pressure.

22. The apparatus as defined in claim 21 wherein said pressure sensing resistance comprises at least one resistor of a Wheatstone bridge disposed on a pressure sensing portion of said piezoresistive sensor.

23. The apparatus as defined in claim 21 wherein said temperature oscillator circuit further comprises:

a digital circuit comprising first, second, third, and fourth inverters coupled in series and each having an input and an output, the output of said first inverter coupled to the input of said second inverter, the output of said second inverter coupled to the input of said third inverter, and the output of said third inverter coupled to the input of said fourth inverter, said digital circuit being operable between bistable high and low states;

positive feedback means coupled in series with a temperature sensing resistance and a capacitance between the output of said second inverter and the input to said first inverter, said temperature sensing resistance varying in accordance with a temperature sensed by said pressure sensing resistance;

negative feedback means in series with a resistance coupled between the output of said third inverter and the input of said first inverter, said negative feedback means providing a charging current for said capacitance;

said temperature sensing resistance varying the charge rate of said capacitance by varying the current flowing through said capacitance in accordance with the temperature sensed by said resistance;

said fourth inverter producing at the output a signal which oscillates between said high and low states at a frequency in accordance with said sensed temperature.

24. The apparatus as defined in claim 23 wherein said temperature sensing resistance comprises at least one resistor disposed in proximity to said pressure sensing resistance so that said pressure sensing and temperature sensing resistances are subject to substantially the same temperatures.

25. The apparatus as defined in claim 23 wherein the output signal provided by said microprocessor is a pulse width modulated signal having a pulse width percentage which varies in accordance with the output signal.

26. The apparatus as defined in claim 25 further comprising an output filter conversion circuit for converting said pulse width modulated signal to a voltage signal having a voltage level varying with respect to the percent pulse width.

* * * * *